(12) United States Patent  (10) Patent No.: US 7,100,974 B2
Schönebeck  (45) Date of Patent: Sep. 5, 2006

(54) VEHICLE ROOF MODULE

(75) Inventor: Horst Schönebeck, Gelnhausen (DE)

(73) Assignee: ArvinMeritor GmbH, (DE)

( * ) Notice: Subject to any disclaimer, the term of this patent is extended or adjusted under 35 U.S.C. 154(b) by 0 days.

(21) Appl. No.: 10/870,842

(22) Filed: Jun. 17, 2004

(65) Prior Publication Data

US 2004/0256891 A1    Dec. 23, 2004

(30) Foreign Application Priority Data

Jun. 20, 2003    (DE) ................................ 103 27 839

(51) Int. Cl.
B60J 7/057    (2006.01)
(52) U.S. Cl. .................. 296/223; 296/216.01
(58) Field of Classification Search ........... 296/187.02, 296/216.01, 24.35, 208, 901.01, 181.6, 181.2, 296/223

See application file for complete search history.

(56) References Cited

U.S. PATENT DOCUMENTS 3,712,664 A * 1/1973 May ............................ 296/102
4,852,422 A    8/1989 Mori
5,746,090 A    5/1998 Boss et al.
6,135,542 A * 10/2000 Emmelmann et al. ...... 296/205
6,273,500 B1 * 8/2001 Boersma et al. ........ 296/216.09
6,318,797 B1 * 11/2001 Bohm et al. ................. 296/210
6,367,872 B1 * 4/2002 Bohm et al. ................. 296/214
6,409,258 B1    6/2002 Grimm et al.
6,513,864 B1    2/2003 Bohm et al.
6,618,944 B1 * 9/2003 Persson et al. ............... 29/897
2003/0159264 A1    8/2003 McLeod et al.

FOREIGN PATENT DOCUMENTS

DE         3409308         *  9/1985
DE         195 31 514 C1      10/1996
DE         101 58 961 A1      6/2003
DE         10158961         *  6/2003
EP         0057886          *  8/1982

OTHER PUBLICATIONS

Translation of DE 10158961, Jun. 18, 2003, Schreiber Translations, inc.*
European Search Report, Feb. 4, 2005.

* cited by examiner

Primary Examiner—Dennise H. Pedder
(74) Attorney, Agent, or Firm—Carlson, Gaskey & Olds

(57) ABSTRACT

A vehicle roof module includes an outer skin and a foamed backing on a rear side of the outer skin. At least one elongated hollow element is embedded in the foamed backing. The elongated hollow element acts as a support for add-on components and may also house signal transmission components, such as cables.

17 Claims, 4 Drawing Sheets

VEHICLE ROOF MODULE

REFERENCE TO RELATED APPLICATIONS

The present invention claims the benefit of German Patent Application No. 103 27 839.7, filed Jun. 20, 2003.

TECHNICAL FIELD

The invention relates to a vehicle roof module comprising an outer skin and a foamed material layer applied as a foamed backing on a rear side of the outer skin.

BACKGROUND OF THE INVENTION

Currently manufactured vehicle roofs are not made as sheet metal roofs welded to, or integrally formed with, a roof frame. Instead, vehicle roofs are increasingly made from a roof module, which is produced by a supplier, that is permanently and rigidly fixed to the roof frame. Note that the phrase "permanently and rigidly fixed" as used in the present description does not exclude the option of removing the roof module from the frame in a workshop to be replaced by a new roof module. In this case, the new roof module will also be permanently and rigidly fixed on the roof frame.

The roof module is usually made of plastic and has an outer skin of aluminum foil or plastic film, for instance, that is provided with a foamed backing layer. Vehicle roof modules of this type may be configured with or without a roof opening system, which opens a movable cover. In a roof module with a roof opening system, a separate frame is screwed to the outer skin from below. The separate frame is configured to accommodate and guide drive cables that open and close the movable cover to prevent the drive cables from buckling. However the frame increases the amount of vertical space occupied by the roof module. Further, there may be a desire to secure more add-on components to the roof module from the inside of the vehicle, increasing the overall cost of the roof module and creating installation problems due to restricted space.

There is a desire for a compact and stable vehicle roof module that simplifies attachment of add-on components, even in the case of retrofitting, and which makes a roof opening system easier to integrate with the roof module.

SUMMARY OF THE INVENTION

A roof module for a vehicle according to one embodiment of the invention has an elongated hollow element embedded in a foamed backing of the roof module. This elongated hollow element is embedded in the foamed backing during a foaming process and surrounded by foamed material. The elongated hollow element stabilizes the roof module without increasing its weight. The elongated hollow element also acts as a support that allows attachment of add-on components via, for example, threaded bolts screwed into the elongated hollow element. The elongated hollow element also serves as a channel for signal transmission elements that run through the elongated hollow element and that can be later drawn into other areas of the vehicle. The signal transmission elements can be, for instance, electric lines, cables or bands.

The elongated hollow element may be an elastic plastic tube that is entirely surrounded by foamed material. The elongated hollow element may also be a metal tube if increasing the stiffness of the roof module and/or transmitting drive forces are a high priority.

One embodiment of the invention embeds parts of a drive device for the roof opening system along with the elongated hollow element into the foamed backing. In particular, a portion of a drive housing may be embedded in the foamed backing by encasing it in the foamed material. As a result, it is much simpler to fasten the rest of the drive device to the roof module. For example, a pinion that meshes with the drive cable may be accommodated in a portion of the drive housing that is located in the foamed backing. In one embodiment, at least one portion of the drive housing is embedded in the foamed backing and has a section that slightly protrudes from the foamed backing. The protruding section allows another portion of the drive housing to be flange-mounted to the embedded drive housing portion.

BRIEF DESCRIPTION OF THE DRAWINGS

Further features and advantages of the invention will be apparent from the following description and the following drawings to which reference is made and in which.

DETAILED DESCRIPTION OF THE PREFERRED EMBODIMENT

Figure 1:
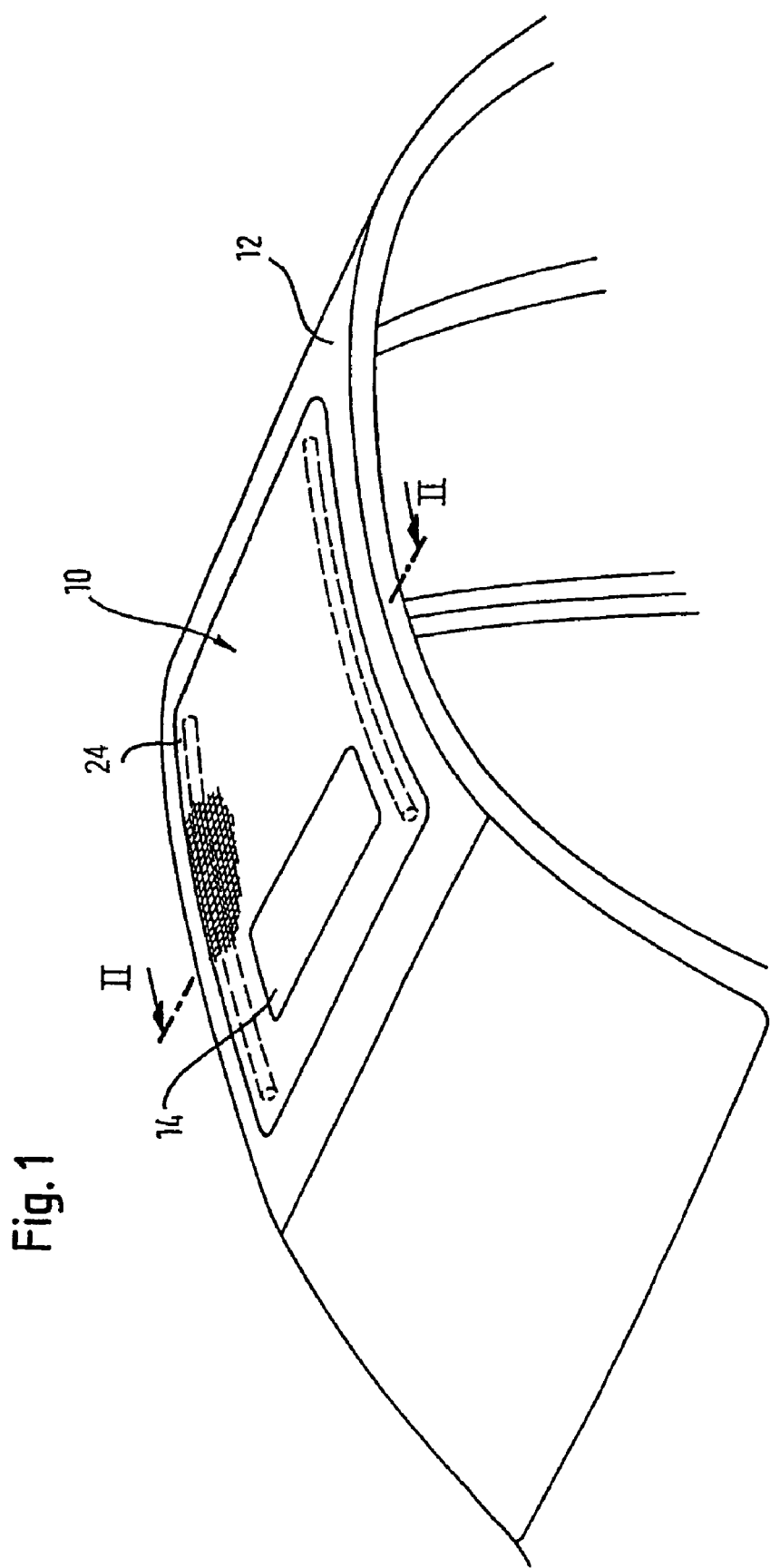
FIG. 1 is a top view of an installed vehicle roof module according to one embodiment of the invention.

FIG. 1 illustrates a roof module 10 for a vehicle equipped with a roof opening system. The roof module 10 is placed on a vehicle frame 12 from above and connected to the vehicle frame 12. The roof module 10 includes an opening that can be opened selectively by a raisable and movable cover 14, which is a part of the roof opening system.

Figure 2:
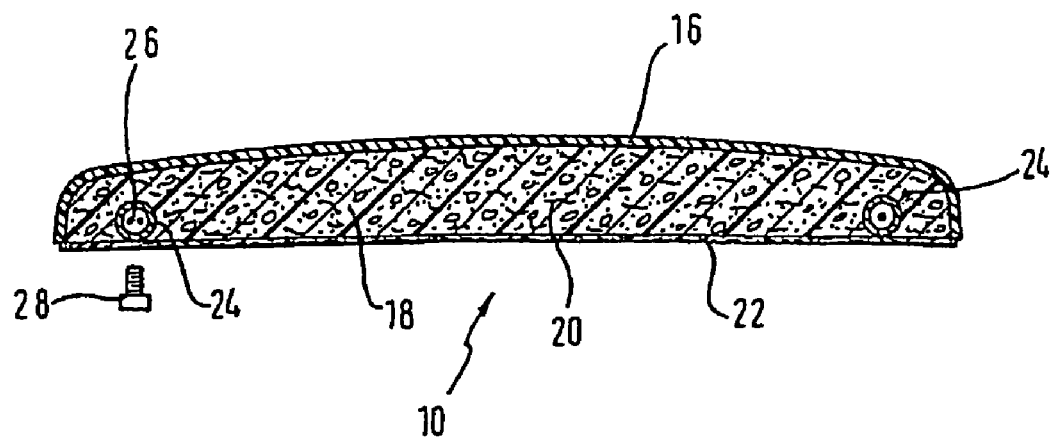
FIG. 2 is a cross-sectional view through the vehicle roof module according to one embodiment of the invention in which a roof opening system is omitted from the figure.

The roof module 10 may include a thermoplastic film (FIG. 2), which forms an outer skin 16 of the roof module 10 and the vehicle itself in the roof area. The outer skin 16 is plastically deformed by deep-drawing and is preferably dyed throughout so that the roof module 10 has a finished surface without a separate painting step.

The outer skin 16 is provided with a foamed backing 18 that is disposed on a rear side of the outer skin 16. The material in the foamed backing 18 may be, for example, foamed polyurethane. The foamed backing 18 may be reinforced with glass fibers 20. The glass fibers 20 may be disposed in the foamed backing 18 via a Long Fiber Injection (LFI) method.

The material used for the foamed backing 18 may connect the outer skin 16 with an inner lining 22. The inner lining 22 may be in the form of a film or a fabric. The inner lining 22 can also be configured as a separate part, particularly if there is a frame for the roof opening system arranged between the outer skin 16 and the inner lining 22. If fabric is used as the inner lining 22, it can be flock-coated, if desired. Both the outer skin 16 and the inner lining 22 can be configured as multiple layer structures.

As shown in FIG. 1, elongated hollow elements 24 in the form of tubes are disposed in the foamed backing 18 on either side of the movable cover 14. The elongated hollow elements 24 may be disposed in the foamed backing 18 so that they are completely embedded in the foamed backing 18. The elongated hollow elements 24 may be in the form of tubes made of metal or plastic.

Signal transmission means 26 may run inside the elongated hollow elements 24. The signal transmission means 26 may include, for instance, electric lines for lighting systems, force transmitting cables or bands, or other similar structures. In the example illustrated in the figures, the signal transmission means 26 are push-pull drive cables for operating the movable cover 14.

A screw 28 can be screwed into the elongated hollow element 24 from the outside to fix an add-on component such as, for example, a loudspeaker, a light or a console, to the roof module 10. If the roof module 10 is provided with an electric roof opening system, the screws 28 used to fasten an electric drive device in the electric roof opening system may be embedded in the foamed backing 18.

Figure 3:
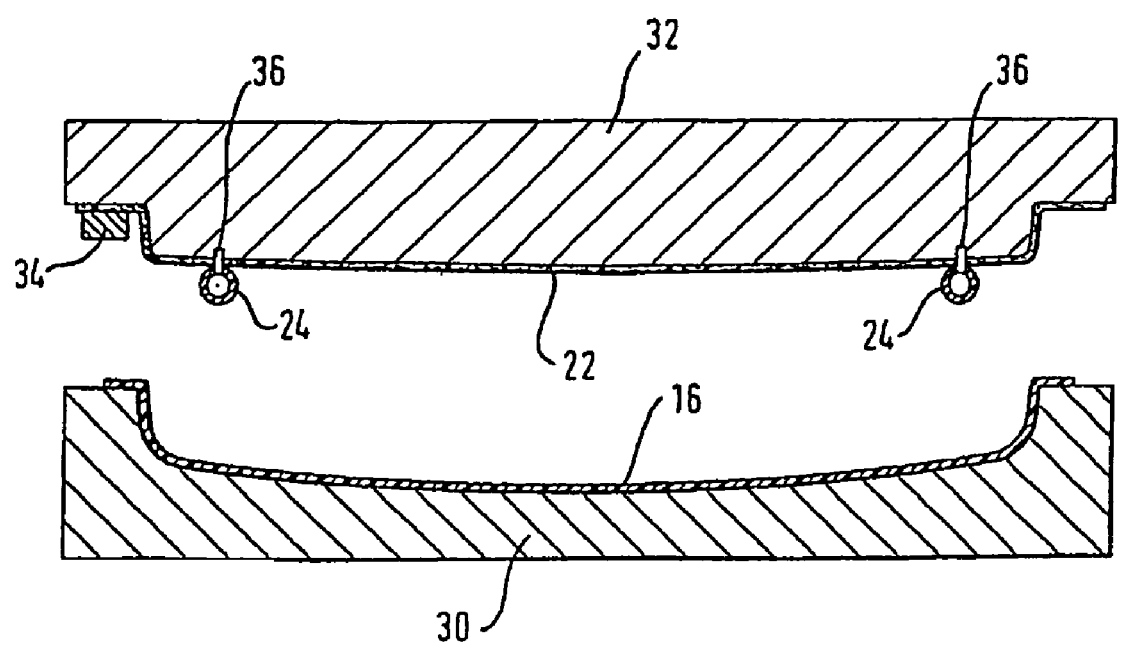
FIG. 3 is a schematic view of a foaming tool in which the vehicle roof module according to one embodiment of the invention is produced.

FIG. 3 illustrates a foaming tool that may be used to manufacture the roof module 10 according to one embodiment of the invention. The outer skin 16, which may be deep-drawn, is placed in a lower part 30 of the tool. The inner lining 22 is fastened to an upper part 32 of the tool by a lateral clamping frame 34 or other retaining device. Next, the elongated hollow elements 24 are fixed to the upper part 32 of the tool by positioning pins 36. The positioning pins 36 protrude through the inner lining 22 and can either be temporarily fixed to the elongated hollow elements 24, protrude into openings in the upper part 32 of the tool, or be permanently fixed to the upper part 32 of the tool to penetrate into positioning openings in the elongated hollow elements 24.

Liquid plastic material, such as liquid polyurethane, with glass fibers 20 injected into the material is then applied on the rear side of the outer skin 16. The foaming tool is then closed so that the plastic material foams up to form the foamed backing 18. The foamed backing 18 connects the outer skin 16 with the inner lining 22 and, in the foaming process, completely embeds the elongated hollow elements 24 in the foamed backing 18.

Figure 4:
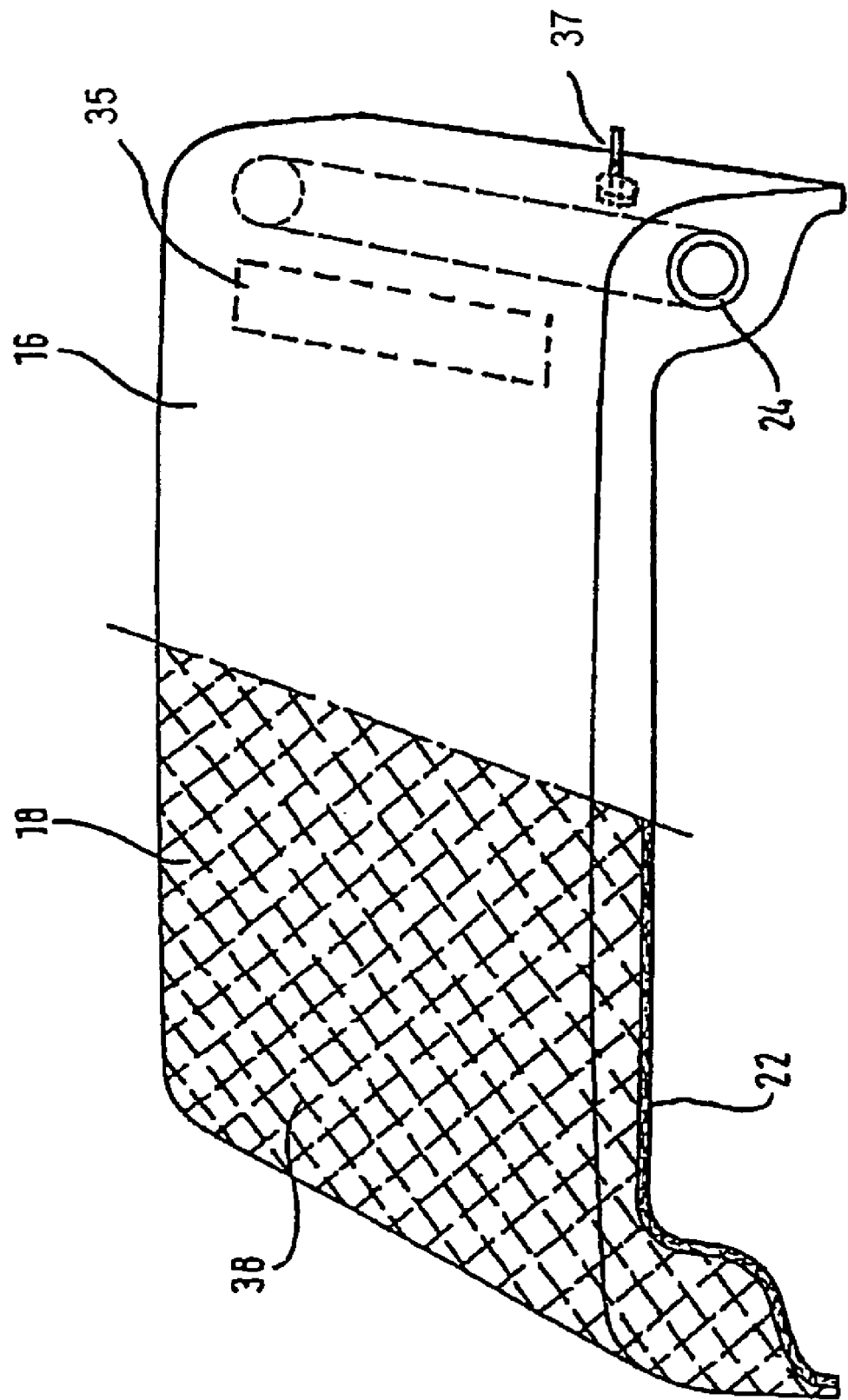
FIG. 4 is a cross-sectional view of the vehicle roof module according to another embodiment of the invention.

As shown in FIG. 4, it is possible to embed additional parts in the foamed backing 18. Possible additional parts include an airbag support 35, a fastening means 37, and/or reinforcing metal sheets. Large-surface planar metal reinforcements, such as a metal network 38 (e.g. a grid, expanded metal) may be embedded in the foamed backing 18 as the reinforcing metal sheet. The metal network 38 improves the crash behavior of the roof module 10 independently of the elongated hollow elements 24.

Figure 5:
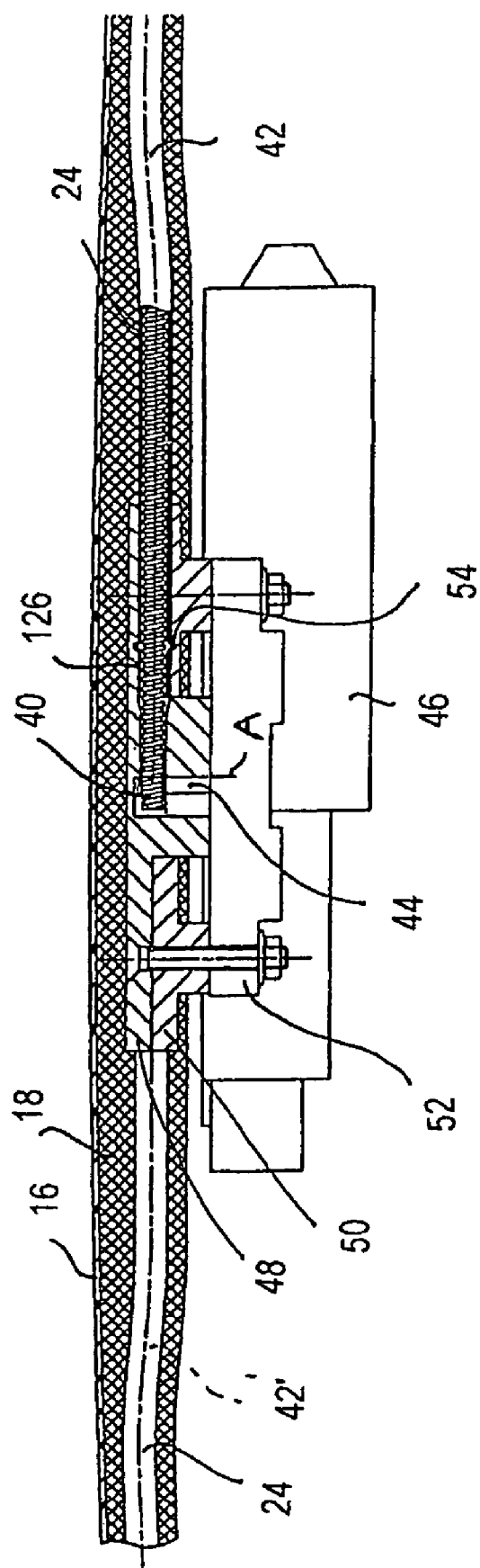
FIG. 5 is a longitudinal sectional view through the vehicle roof module according to one embodiment of the invention in an area of a drive device for a cover.

FIG. 5 is a longitudinal section view of the roof module 10 in an area of a drive device for the movable cover 14. In this figure, the section view is offset at line A, i.e. the section on the right-hand side of line A lies in a plane that is different from the plane of the section on the left-hand side of line A. To operate the cover 14, the roof module 10 includes two drive cables 126, such as those described in U.S. Pat. No. 5,746,090, which is incorporated in the present application by reference. The drive cables 126 have sections that run parallel to each other and are guided so that they do not buckle. The drive cables 126 are driven in opposite directions by a pinion 40 disposed between the drive cables 126. Because the overall drive device preferably extends in an area of a front end of the roof module 10 and transverse to the vehicle as a whole, the drive cables 126 are guided in this area in channels 42, 42' formed by the elongated hollow elements 24.

The pinion 40 is cantilevered on a drive shaft 44, which is rotated by a drive motor 46. The pinion 40 is accommodated in a multi-part drive housing that is partially embedded in the foamed backing 18, with a part of the drive housing being encased in the foamed material. The drive housing includes, among other things, an upper housing cover 48 that has a chamber for accommodating the pinion 40 and the drive shaft 44 and a lower housing cover 50. The upper housing cover 48 and the lower housing cover 50 may each have a portion embedded in the foamed backing 18. The upper housing cover 48 and the lower housing cover 50 each partially protrude from the foamed backing 18. The drive motor 46 and a gearbox 52 are fixed from below by screwing down the upper and lower housing covers 48 and 50.

The ends of the two elongated hollow elements 24 are fixed to the upper housing cover 48 by an outwardly protruding annular bead 54. Each end of each elongated hollow element 24 is received in a groove in an associated opening in the upper housing cover 48.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A vehicle roof module comprising:
   an outer skin;
   a foamed backing disposed on a rear side of the outer skin, the foamed backing being made of a foamed material;
   an elongated hollow element embedded in the foamed backing;
   at least one push-pull drive cable that operates a roof opening system and that runs through the elongated hollow element; and
   a drive housing for the roof opening system comprising a first cover and a second cover, each of the first and the second covers being at least partially embedded into the foamed material.

2. The vehicle roof module according to claim 1, wherein the elongated hollow element is a metal tube.

3. The vehicle roof module according to claim 1, wherein the elongated hollow element is a plastic tube.

4. The vehicle roof module according to claim 1, wherein the outer skin comprises a plastic film that is dyed substantially throughout.

5. The vehicle roof module of claim 4, wherein the outer skin is a deep-drawn plastic film.

6. The vehicle roof module according to claim 1, further comprising an inner lining adjoining an inner side of the foamed backing.

7. The vehicle roof module according to claim 1, further comprising a pinion disposed in the drive housing and meshing with the at least one push-pull drive cable.

8. The vehicle roof module according to claim 1, further comprising at least one of a planar reinforcement, a fastening means, and an airbag support embedded in the foamed backing.

9. The vehicle roof module according to claim 1, further comprising a plurality of reinforcing fibers disposed in the foamed backing.

10. The vehicle roof module according to claim 1, wherein the elongated hollow element comprises a plurality of elongated hollow reinforcement elements with at least one of the plurality of elongated hollow reinforcement elements being positioned to extend along one longitudinal side of the cover and at least one other of the plurality of elongated hollow reinforcement elements being positioned to extend along an opposite longitudinal side of a cover.

11. The vehicle roof module according to claim 1 wherein the first cover includes an upper surface in direct contact with the foamed backing and the second cover includes a lower surface in direct contact with the foamed backing.

12. The vehicle roof module according to claim 11 including a pinion that drives the at least one push-pull drive cable wherein the first cover includes a chamber that accommodates the pinion.

13. The vehicle roof module according to claim 12 including a drive motor having a drive shaft wherein the pinion is cantilevered on the drive shaft.

14. The vehicle roof module according to claim 11 wherein the first cover has a lower surface and the second cover has an upper surface and including at least one fastener that secures the first and second covers together such that the upper surface of the second cover is in direct abutting contact with the lower surface of the first cover.

15. The vehicle roof module according to claim 11 wherein the first cover includes a first outer peripheral surface extending downwardly from the upper surface and wherein the second cover includes a second outer peripheral surface extending upwardly from the lower surface, the first and second outer peripheral surfaces each directly abutting against the foamed backing.

16. The vehicle roof module according to claim 1 wherein the elongated hollow element includes a first attachment feature and the first cover includes a second attachment feature that cooperates with the first attachment feature to fix the elongated hollow element to the first cover.

17. The vehicle roof module according to claim 16 wherein the first attachment feature comprises one of a bead and a groove and the second attachment feature comprises the other of the bead and the groove.

* * * * *